United States Patent [19]

Karnopp et al.

[11] Patent Number: 4,941,097
[45] Date of Patent: Jul. 10, 1990

[54] STEERING CONTROL METHODS AND APPARATUS

[75] Inventors: Dean C. Karnopp; Yoshiyuki Yasui, both of Davis, Calif.

[73] Assignee: Aisin Seiki Kabushiki Kaisha, Kariya, Japan

[21] Appl. No.: 243,822

[22] Filed: Sep. 13, 1988

[51] Int. Cl.$^5$ .............................................. B62D 5/22
[52] U.S. Cl. ................................ 364/424.05; 180/79.1; 180/142; 180/148
[58] Field of Search ................ 364/424.01, 424.05; 180/141, 142, 148, 79.1, 132; 280/47.34; 303/96

[56] References Cited

U.S. PATENT DOCUMENTS

| 3,866,706 | 2/1975 | Lincke et al. | 180/142 |
| 4,049,961 | 9/1977 | Marcy | 180/169 |
| 4,540,059 | 9/1985 | Shibahata et al. | 180/141 |
| 4,706,771 | 11/1987 | Kawabe et al. | 364/424.05 |
| 4,708,220 | 11/1987 | Noto et al. | 364/424.05 |
| 4,718,685 | 1/1988 | Kawabe et al. | 180/140 |
| 4,758,053 | 7/1988 | Yasuno | 303/96 |
| 4,759,419 | 7/1988 | Nagae et al. | 180/142 |
| 4,771,846 | 9/1988 | Venable et al. | 180/142 |
| 4,773,012 | 9/1988 | Ito et al. | 180/142 |

FOREIGN PATENT DOCUMENTS 2203395 5/1988 United Kingdom ................ 180/141

OTHER PUBLICATIONS

Article: "Adaptive Steering", J. T. Kasselmann et al (pp. 26–35).

Primary Examiner—Gary Chin
Attorney, Agent, or Firm—Burns, Doane, Swecker & Mathis

[57] ABSTRACT

The steering stability of a moving vehicle is maintained by measuring an actual yaw rate of the vehicle and determining a desired yaw rate of the vehicle. An output signal is produced in response to a comparison of the actual and desired yaw rates. The angle of steerable wheels of the vehicle is controlled in response to the output signal in a manner tending to substantially conform the actual yaw rate to the desired yaw rate, thereby maintaining vehicle stability. The steerable wheels are steered by a steering wheel, and are independently steered in response to the output signal. Alternatively, the steerable wheels are steered solely in response to the output signal.

10 Claims, 6 Drawing Sheets

STEERING CONTROL METHODS AND APPARATUS

BACKGROUND OF THE INVENTION

The present invention generally relates to apparatus for steering a vehicle.

During vehicle motion, such as cornering, for example, vehicle handling dynamics are affected by various parameters such as road conditions, tire characteristics, weight distribution, braking, accelerating, and the like, which can lead to oversteer or understeer conditions. In an effort to deal with this problem and attempt to maintain vehicle handling dynamics constant, there have been heretofore proposed complex suspension link systems, drive train arrangements, and braking systems. However, such proposed systems involve relatively numerous parts which undesirably increase the complexity and size of the system.

BRIEF SUMMARY OF THE INVENTION

The present invention involves methods and apparatus for maintaining the stability of a moving vehicle. The apparatus includes a mechanism for measuring an actual yaw rate of the vehicle, and a mechanism for determining a desired yaw rate of the vehicle and for producing an output signal in response to a comparison of the desired yaw rate and actual yaw rate. A steering mechanism is responsive to the output signal for controlling the angle of steerable wheels of the vehicle for maintaining vehicle stability.

Preferably, the mechanism for determining the desired yaw rate comprises a first sensor for detecting a steering angle of the vehicle, and a second sensor for detecting the vehicle speed.

The steering mechanism preferably comprises a steering wheel, and a mechanical drive train mechanically connecting the steering wheel to the steerable wheels for changing the wheel angle thereof in response to rotation of the steering wheel. A steering adjusting mechanism is responsive to the output signal for changing the wheel angle of the steerable wheels independently of the mechanical drive train.

In lieu of a mechanical drive train, the steerable wheels could be steered solely in response to the output signal. This is achieved wherein the steering mechanism includes a steering wheel. A sensor senses the steering wheel angle and produces a signal which is delivered to a controller that includes means for measuring the desired yaw rate. The steering wheel is operably connected to the steerable wheels solely through the controller.

BRIEF DESCRIPTION OF THE DRAWINGS

The objects and advantages of the invention will become apparent from the following detailed description of preferred embodiments thereof in connection with the accompanying drawings in which like numerals designate like elements, and in which.

DETAILED DESCRIPTION OF PREFERRED EMBODIMENTS OF THE INVENTION

Figure 1:
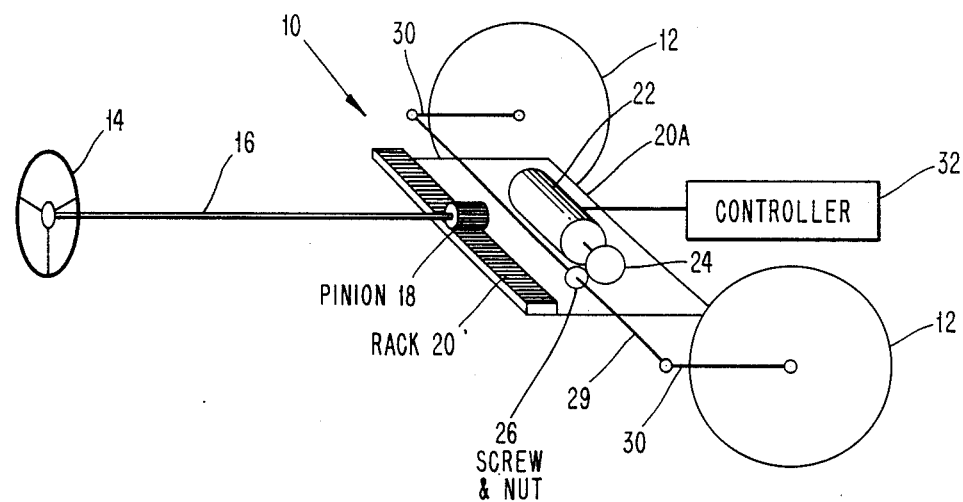
FIG. 1 is a schematic perspective view of a first embodiment of a steering mechanism for the steerable wheels of a vehicle, in accordance with the present invention.
Figure 2:
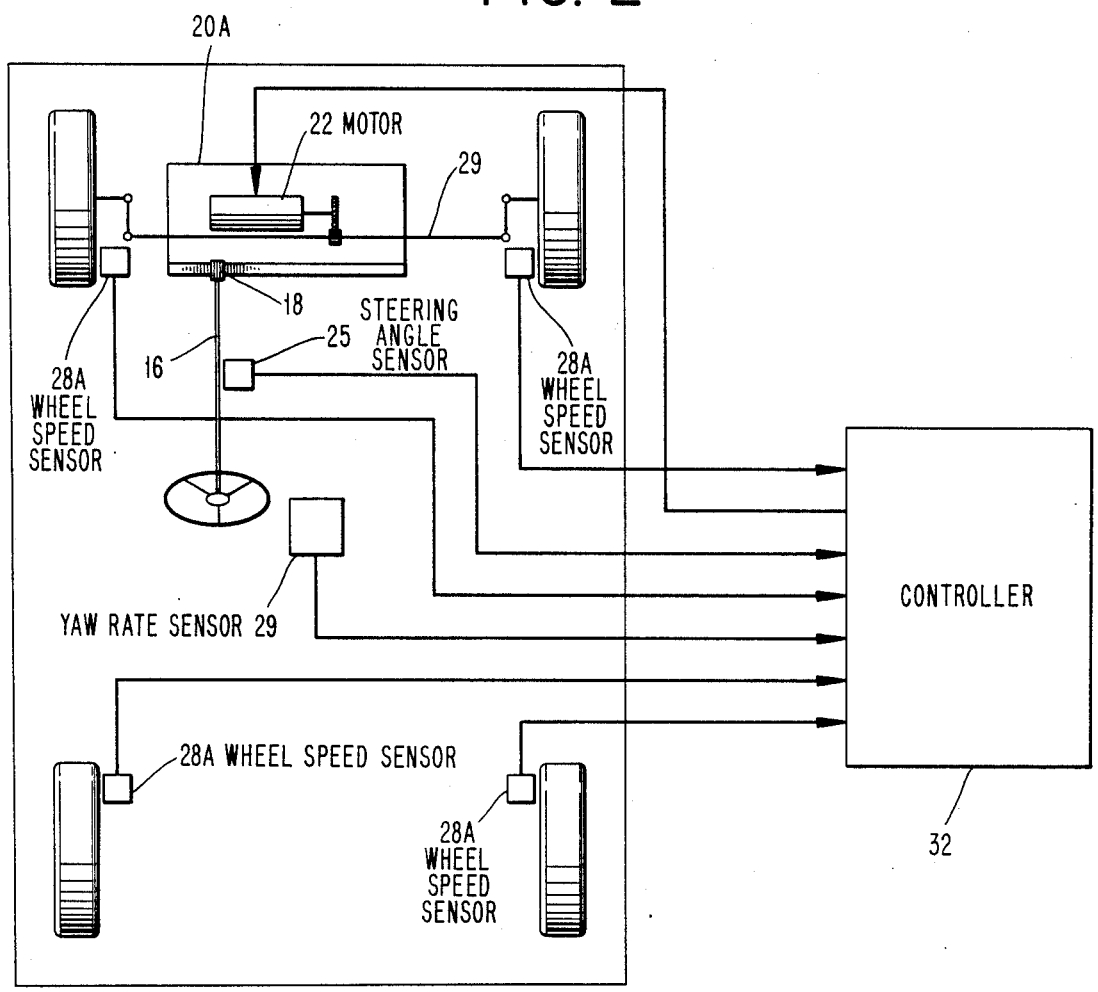
FIG. 2 is a schematic diagram of a first embodiment of a mechanism for controlling the steering mechanism, according to the present invention.

Depicted in FIG. 1 is a steering system 10 for a vehicle which includes a pair of steerable wheels 12 operably connected to a steering wheel 14 by means of a steering mechanism. The steering mechanism is of the rack and pinion type wherein the steering shaft 16 carries a pinion 18 which meshes with teeth on a reciprocable rack 20. Fixed on an extension 20A of the rack is an electric motor housing 22. The motor includes an output shaft which drives an output gear 24. The output gear meshes with a helical thread of a nut 26 which is fixed to a tie rod 28. The ends of the tie rod 28 are connected to a pair of steering arms 30 which transmit steering motion to the steerable wheels 12.

Thus, in practice, the shaft 16 and pinion produce linear movement of the rack 20 and rack extension 20A, and such linear movement is transmitted to the motor housing and output gear 24. The latter produces a linear movement of the nut 26 due to the meshed coupling between the output gear 24 and the nut 26. Linear movement of the nut 26 is transmitted directly to the tie rod 28. In this fashion, the orientation of the wheels 12 can be varied by turning the steering wheel.

In order to prevent excessive oversteer or understeer, the present invention enables the wheel orientation to be adjusted independently of the position of the steering wheel by actuation of the motor 22 to produce rotation of the output gear 24 and a resulting linear movement of the nut 26 and tie rod 28.

Actuation of the motor 22 is produced by electrical signals from a controller 32 which utilizes signals dependent upon steering angle and vehicle speed to determine a desired yaw rate, and compares that desired yaw rate to an actual yaw rate to control the tire angle. Yaw rate can be defined as the rate of rotation of the vehicle about a vertical axis.

The steering angle signal (6) is provided by a conventional steering wheel angle sensor 25 which is operably connected to the steering shaft 16 of the vehicle. The vehicle speed signal (V) is provided by conventional wheel speed sensors 28A operably connected to all ground wheels of the vehicle. If the wheel speeds are different, the controller will obtain an average thereof. An actual yaw rate is measured by a conventional yaw rate sensor such as a gyro 29.

A desired yaw rate ($\theta_d$) is calculated by the controller in accordance with the relationship:

$$\theta_d = \frac{V \cdot \delta}{L + \left(\frac{KV^2}{g}\right)}$$

where $\theta_d$ is the desired yaw rate, L is the length of the wheel base of the vehicle (i.e., the distance between the front and rear axles, g is acceleration due to gravity, $\delta$ is the steering angle, V is vehicle speed, and K is a constant greater than 0 and no greater than 1 degree in order to achieve a neutral or slightly understeer condition.

After determining the desired yaw rate $\theta_d$ in the above manner, the controller compares the desired yaw rate value with the actual yaw rate $\theta_a$. When $\theta_1 = \theta_d$ no steering adjustment is necessary; when $\theta_a < \theta_d$, an understeer condition exists, requiring that the amount of tire angle be increased; and when $\theta_a > \theta_d$, an oversteer condition exists requiring that the amount of tire angle be decreased. The direction in which the output gear 24 is rotated is dependent upon which of the values $\theta_a$ and $\theta_d$ is larger, and the amount of rotation of the output gear 24 is dependent upon the magnitude of the difference between the values $\theta_a$ and $\theta_d$. Rotation of the output gear 24 continues until the controller observes that $\theta_a = \theta_d$.

Figure 4:
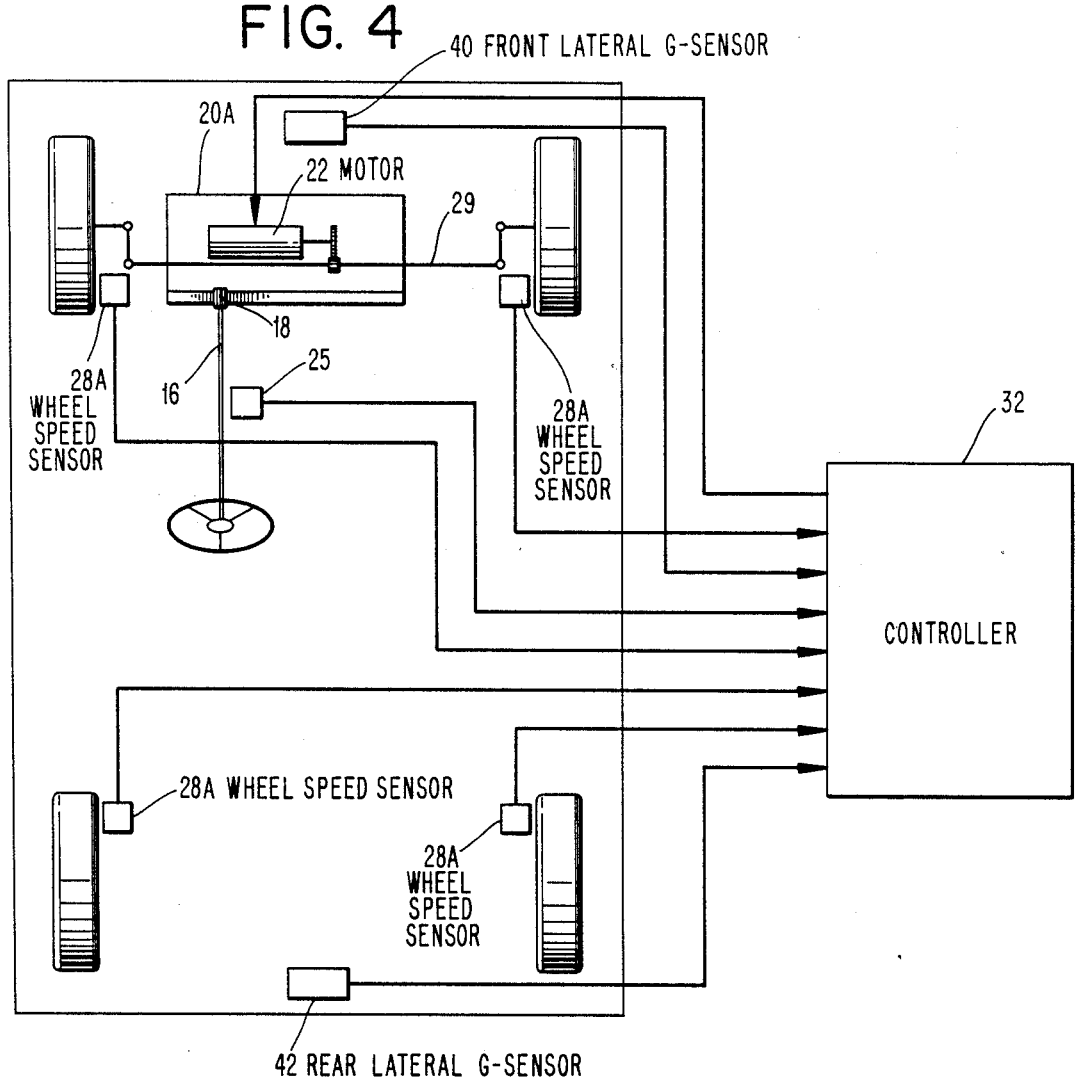
FIG. 4 is a schematic diagram of a second embodiment of a system for controlling the steering mechanism, in accordance with the present invention.
Figure 5:
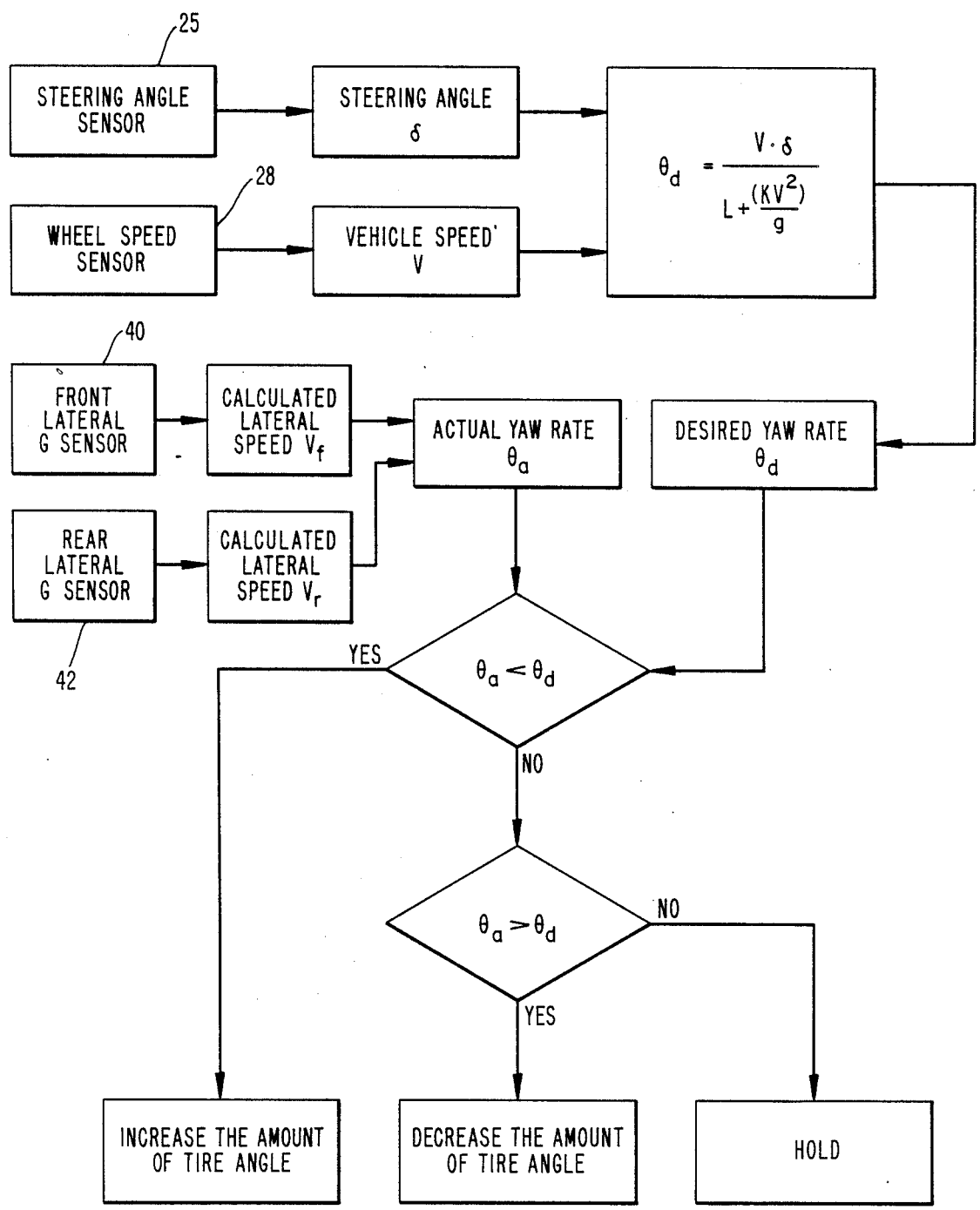
FIG. 5 is a flow chart for the system shown in FIG. 4.

In FIGS. 4 and 5, another preferred embodiment of the control aspect of the present invention is depicted wherein an alternative way of determining actual yaw rate is employed. That is, in lieu of a yaw rate sensor there are employed conventional front and rear lateral acceleration (G-force) sensors 40, 42. The measured front and rear lateral accelerations are converted to front and rear lateral velocity values $V_f$, $V_r$ respectively by the controller, enabling the actual yaw rate $\theta_a$ to be determined by the following relationship:

$$\theta_a = \frac{V_f - V_r}{N}$$

where N is the distance between the front and rear sensors 40, 42.

Figure 6:
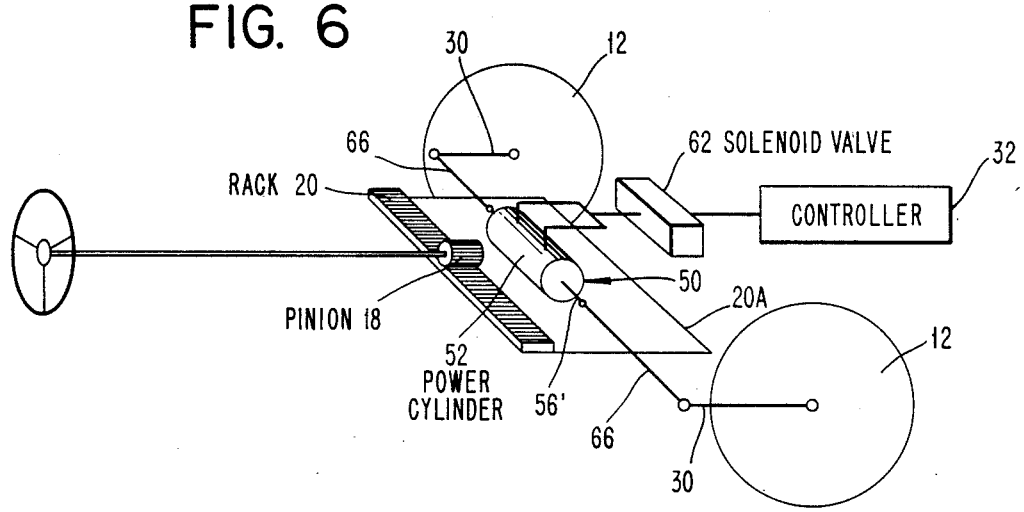
FIG. 6 is a schematic perspective view of a second embodiment of a steering mechanism for steering the steerable wheels.
Figure 7:
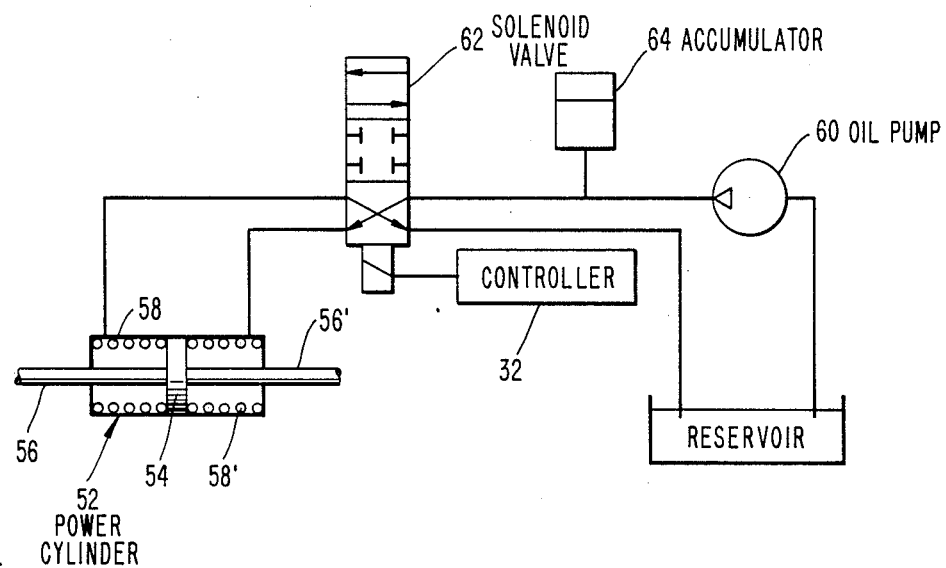
FIG. 7 is a schematic representation of a portion of the steering mechanism of FIG. 6.

In FIGS. 6 and 7, a second preferred embodiment of a steering mechanism aspect of the invention is depicted wherein the electric motor has been replaced by a pressurized fluid motor 50. The fluid motor comprises a fluid cylinder 52 in which is disposed a reciprocable piston 54. A pair of piston rods 56, 56' are connected to opposite sides of the piston 54 and project from opposite ends of the cylinder. A pair of springs 58, 58' disposed within the cylinder bias the piston 54 to a central location within the cylinder 52. An oil pump 60, operated by the engine, supplies pressurized fluid to a three-way solenoid valve 62, the position of which is determined by a signal from the controller 32. An accumulator 64 can be provided in the fluid line between the pump 60 and the valve 72 to dampen vibrations in oil pressure.

In operation, steering of the wheels 12 is effected by the steering wheel 14 and the rack and pinion coupling 18, 20. Linear movement of the rack 20 is transmitted to the cylinder 52 which is fixedly mounted on the rack extension 20A. Linear movement of the cylinder is transmitted to the tie rods 66 which are connected to outer ends of the piston rods 56, 56'. In the event that the controller 32 detects an understeer or oversteer condition, the electrically actuable solenoid valve 62 is actuated by an electric output signal from the controller 32 to displace the piston in either of two directions to turn the wheels 12 independently of the position of the steering wheel, thereby making the needed correction in tire angle.

Figure 8:
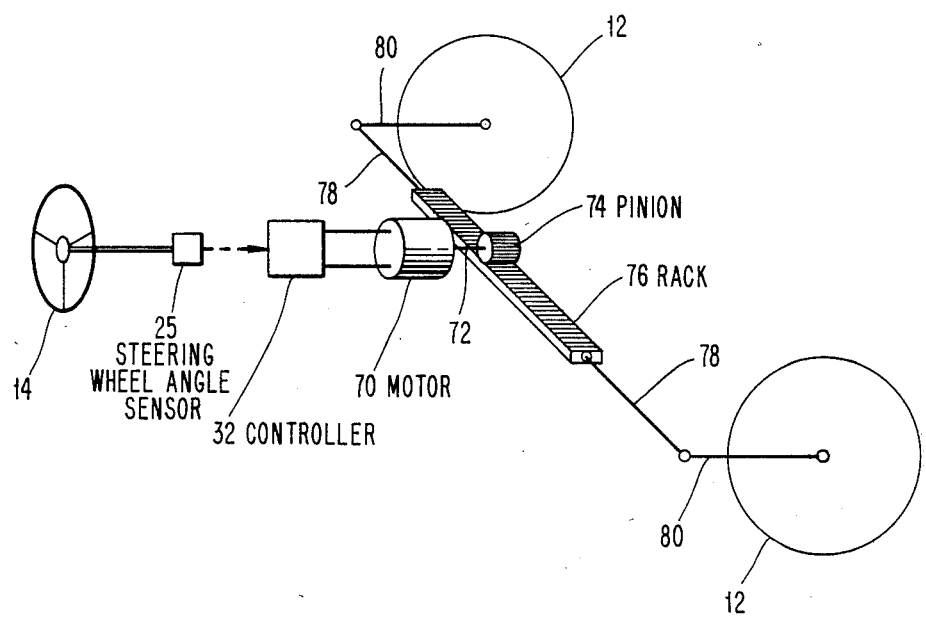
FIG. 8 is a schematic perspective view of a third embodiment of a steering mechanism according to the present invention.

FIG. 8 depicts a third preferred embodiment of the steering mechanism wherein there is no mechanical connection between the steering wheel 14 and the steerable wheels 12. Rather, the rack and pinion are controlled solely by electrical signals from the controller 32. The controller 32 is electrically connected to an electric motor 70, the output shaft 72 of which is connected to a pinion 74. The pinion meshes with the teeth of a rack 76, the ends of which are connected to tie rods 78. The tie rods 78 are connected to steering arms 80.

Figure 3:
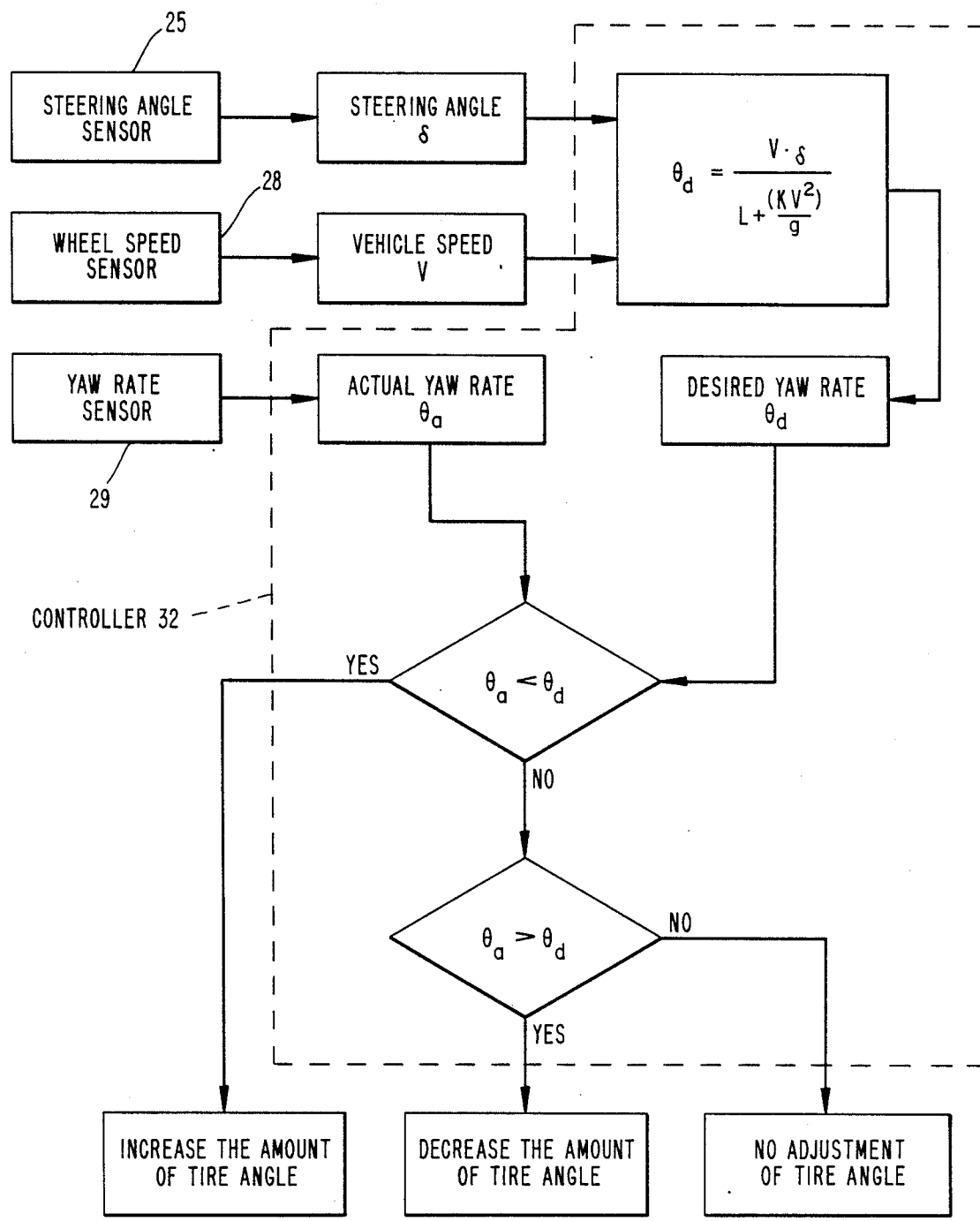
FIG. 3 is a flow chart for the system shown in FIG. 2.

In operation, rotation of the steering wheel 14 results in a signal being generated by the steering wheel angle sensor 25. That signal is supplied to the controller in the same fashion as disclosed in connection with FIG. 3. Thus, whenever the steering wheel is turned, the controller will deliver a control signal to the motor 70 for turning the steerable wheels 12 by an amount which avoids an appreciable oversteer or understeer.

Figure 9:
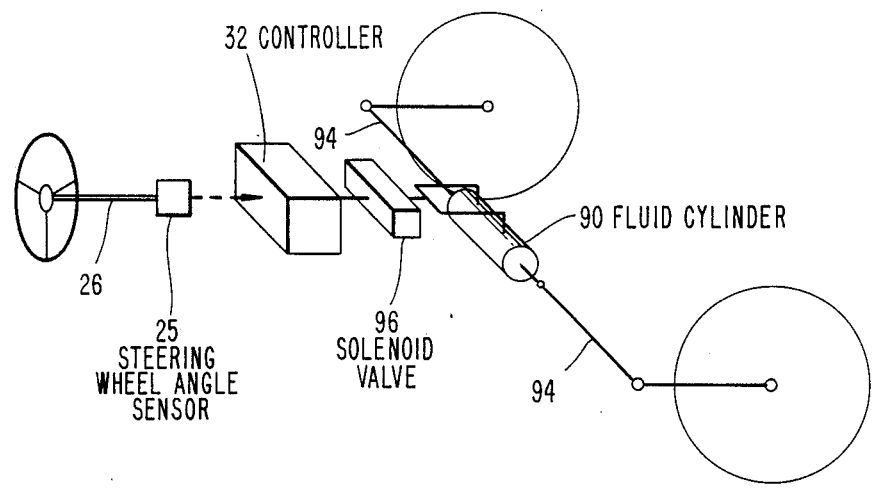
FIG. 9 is a schematic perspective view of a fourth embodiment of a steering mechanism in accordance with the present invention.
Figure 10:
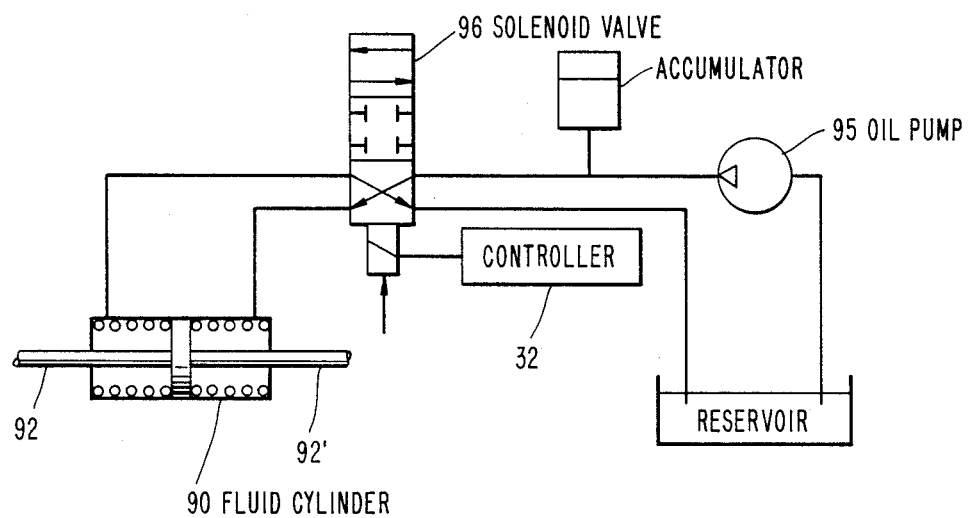
FIG. 10 is a schematic view of a portion of the steering mechanism of FIG. 9.

FIG. 9 depicts a fourth preferred embodiment of a steering mechanism which is a variant of that described above in connection with FIG. 8 in that the controller 32 controls a fluid mechanism similar to that described above in connection with FIGS. 6 and 7. That is, a fluid cylinder 90 has piston rods 92, 92' connected to tie rods 94. The output signal from the controller 32 is delivered to a three-way solenoid valve 96 to cause pressurized fluid to be conducted from a pump 95 to the fluid cylinder 90 to steer the steerable wheels 12.

In accordance with the present invention, a steering system is provided which minimizes oversteer and understeer conditions in a simplified manner requiring a minimum number of parts. The system is highly versatile in that implementation thereof is possible in numerous ways.

Although the invention has been described in connection with preferred embodiments thereof, it will be appreciated by those skilled in the art that additions, substitutions, modifications, and deletions not specifically described, may be made without departing from the spirit and scope of the invention as defined in the appended claims.

What is claimed is:

1. Apparatus for maintaining steering stability of a moving vehicle comprising:

steerable wheels and steering arm means connected to said steerable wheels, and steering means for steering said steerable wheels, including a movable rack, a main steering mechanism, including a steering wheel and pinion, connected to said movable rack for moving said movable rack, motor means operably interconnecting said movable rack and said steering arm means for transmitting steering forces from said main steering mechanism to said steerable wheels, said motor means comprising relatively movable first and second parts, said first part connected to said movable rack and said second part connected to said steering arm means, measuring means for measuring an actual yaw rate of said vehicle, and control means for determining a desired yaw rate for said vehicle, and for generating an output signal in response to a comparison of said desired and actual yaw rates, said control means being operably connected to said motor means whereby said motor means is actuated in response to said output signal to steer said steerable wheels independently of movement of said movable rack.

2. Apparatus according to claim 1, wherein said steering means turns said steerable wheels in a manner tending to substantially conform said actual yaw rate with said desired yaw rate.

3. The apparatus according to claim 1, wherein said control means includes first sensor means for detecting a steering angle of said steering wheel, and second sensor means for detecting vehicle speed.

4. The apparatus according to claim 3, wherein said second sensor means comprises a wheel speed sensor for detecting the speed of rotation of each of a plurality of wheels of said vehicle.

5. The apparatus according to claim 1, wherein said measuring means includes a yaw rate gyro.

6. The apparatus according to claim 1, wherein said measuring means includes front and rear side-direction G sensors.

7. Apparatus according to claim 1, wherein said motor means comprises a fluid motor.

8. Apparatus according to claim 7, wherein said first part comprises a cylinder of said fluid motor and said second part comprises a piston rod of said fluid motor.

9. Apparatus according to claim 1, wherein said motor means comprises an electric motor.

10. Apparatus according to claim 9, wherein said first part comprises a housing of said motor means and said second part comprises an output gear of said motor means.

* * * * *